United States Patent
Imaizumi et al.

(10) Patent No.: US 6,593,935 B2
(45) Date of Patent: *Jul. 15, 2003

(54) IMAGE PROCESSOR

(75) Inventors: Shoji Imaizumi, Shinshiro (JP); Junji Nishigaki, Toyokawa (JP); Kenichi Morita, Toyohashi (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/295,596

(22) Filed: Apr. 22, 1999

(65) Prior Publication Data

US 2002/0158868 A1 Oct. 31, 2002

(30) Foreign Application Priority Data

Apr. 24, 1998 (JP) .......................... 10-114766

(51) Int. Cl.[7] ................................. G09G 5/00
(52) U.S. Cl. ...................... 345/619; 382/163; 382/232; 382/235
(58) Field of Search ................ 345/481, 419, 345/421, 422, 426, 619, 620, 629, 581, 589, 601, 602, 593–599, 501, 520, 555, 502; 382/163, 164, 165, 166, 173, 175, 176, 190, 195, 206, 232, 233, 235, 239, 243–247, 162

(56) References Cited

U.S. PATENT DOCUMENTS

| 4,799,106 | A | | 1/1989 | Moore et al. ............... 358/168 |
| 5,001,574 | A | | 3/1991 | Shimizu et al. ............. 358/448 |
| 5,689,590 | A | * | 11/1997 | Shirasawa et al. .......... 382/162 |
| 5,805,303 | A | * | 9/1998 | Imaizumi et al. ........... 358/433 |
| 5,854,857 | A | * | 12/1998 | De Queiroz et al. ........ 382/232 |
| 5,943,064 | A | * | 8/1999 | Hong ......................... 345/502 |
| 6,198,845 | B1 | * | 3/2001 | Tse et al. .................... 382/169 |

FOREIGN PATENT DOCUMENTS

| JP | 408079533 A | * | 3/1996 | ............. G06T/5/00 |
| JP | 410098622 A | * | 4/1998 | ............. G06T/7/60 |

* cited by examiner

Primary Examiner—Mano Padmanabhan
(74) Attorney, Agent, or Firm—Burns, Doane, Swecker & Mathis, LLP

(57) ABSTRACT

In an image processor, after the background of input image data is removed, the image data are divided into a plurality of areas, and the attribute of image is discriminated for each area. The image data after the background removal is compressed according to the result of attribute discrimination. The amount of the background removal can be controlled. Preferably, the amount of the background removal is controlled according to the discriminated attribute. Then, the background can be removed without artificial feeling in a reproduced image.

8 Claims, 16 Drawing Sheets

Fig.8

| Page 1 Data |
|---|
| Page 2 Data |
| Page 3 Data |
| Page 4 Data |
| ⋮ |
| Page 1023 Data |
| Page 1024 Data |

| |
|---|
| Image size in main scan |
| Image size in subscan |
| Starting room address of attribute data write |
| Starting room address of attribute data write |
| Starting room address of secondary attribute data write |
| Starting room address of secondary attribute data write |
| Color / monochrome information |
| Secondary compression ON / OFF signal |
| Background removal table information |

IMAGE PROCESSOR

This application is based on application No. 10-114766 filed in Japan, the contents of which are hereby incorporated by reference.

BACKGROUND OF THE INVENTION

1. Field of the Invention

The present invention relates to an image processor which removes background from image data.

2. Description of Prior Art

In the field of image data processing, it is known to divide digital image data into a plurality of areas, to decide the attribute of the image of each area and to compress image data according to the attribute. Digital image data are subjected to various processings such as edge emphasis.

In the image processing, background portions in image data may be discriminated and removed. In the background removal processing, it is known to detect the background by using a certain width (for example, between two values of average density) and to replace the portions decided to have background attribute with white background data.

However, the background removal has following problems. When background removal is performed on a photograph image, its highlight portions are liable to be removed. Further, it is desirable that the background is not removed for an image such as a photograph image having many highlight portions.

When the background is detected with a certain width, the resultant image may have discontinuous gradation at highlight density portions in correspondence to the threshold of the decision condition, and it may give artificial feeling for an image.

Further, in variable length coding, it is necessary to encode the white background efficiently in order to increase compression rate. Therefore, it is important to detect the background precisely.

SUMMARY OF THE INVENTION

An object of the present invention is to provide an image processor which can remove the background of an image without artificial feeling in a system for compressing image data.

In one aspect of the invention of an image processor, a background remover removes background from image data. A divider divides the image data, which have been subjected to the background removal, to a plurality of blocks, and an attribute discriminator means discriminates an attribute of image data in each block. A compressor compresses the image data in a block, from which the background has been removed, according to the attribute of the block.

In a second aspect of the invention of an image processor, a background remover removes an amount of background removal from image data, and an attribute discriminator means discriminates an attribute of the image data on which the background remover has removed a predetermined amount of the background. A controller changes the amount of background removal of the background remover according to the attribute. A compressor compresses the image data on which the background has been removed by the amount changed by the controller.

In a third aspect of the invention of an image processor, a background remover removes background from image data, and a first compressor compresses the image data which have been subjected to background removal. A divider divides the image data, which have been subjected to background removal, to a plurality of blocks, and an attribute discriminator means discriminates an attribute of image data in each block. Then, a second compressor compresses the image data in a block, which have been compressed, according to the attribute of the block.

An advantage of the present invention is that an image is recovered without artificial feeling at highlight portions thereof.

Another advantage of the present invention is that the amount of background remove can be set to a value appropriate to an image.

A further advantage of the present invention is that image quality is changed selectively according to the amount of background removal.

BRIEF DESCRIPTION OF THE DRAWINGS

These and other objects and features of the present invention will become clear from the following description taken in conjunction with the preferred embodiments thereof with reference to the accompanying drawings, and in which:

FIG. 8 is a diagram of information on document image data to be stored to the working RAM;

DETAILED DESCRIPTION OF THE PREFERRED EMBODIMENTS

Figure 1:
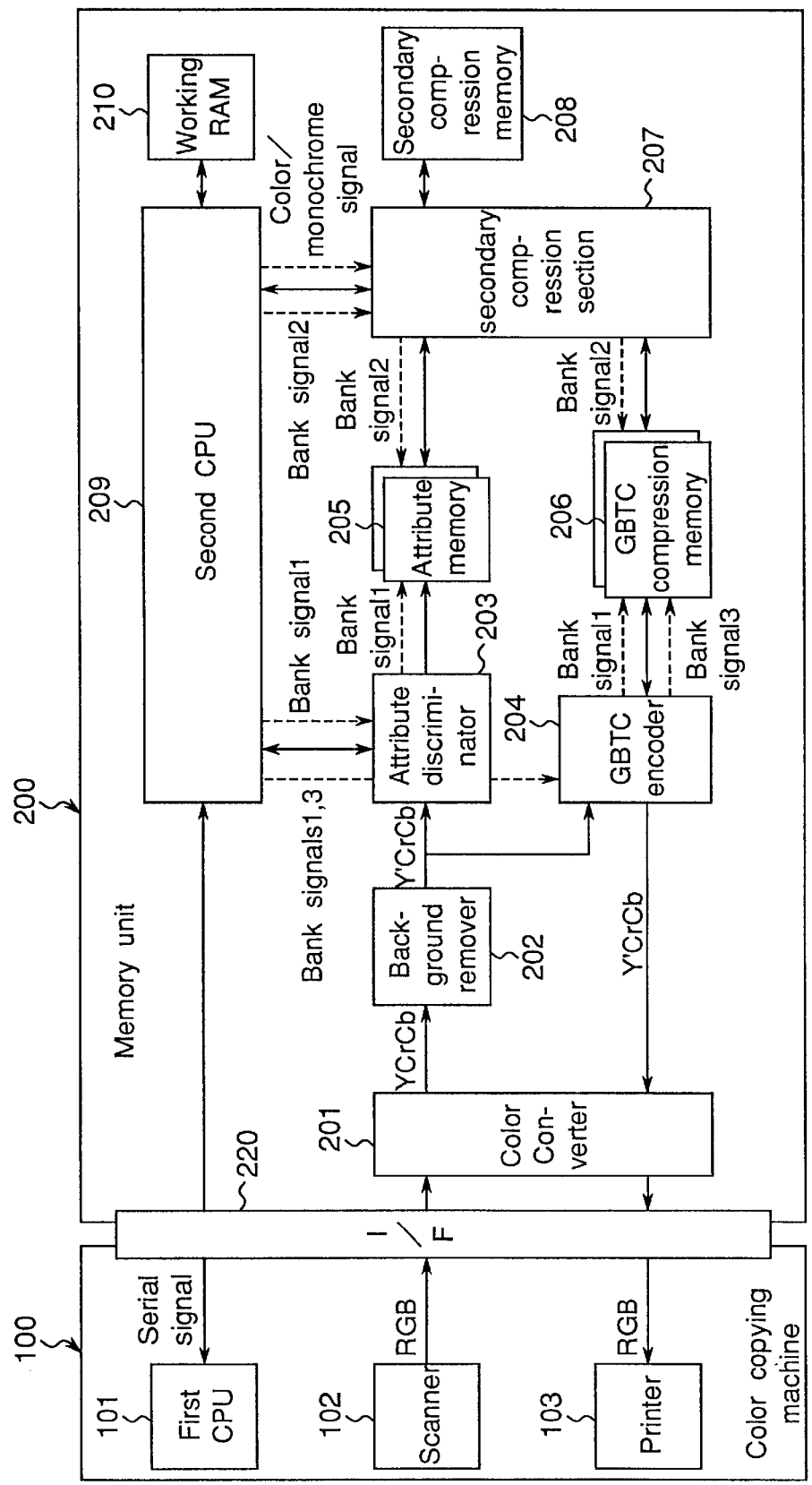
FIG. 1 is a block diagram of a copying machine and a memory unit.

Referring now to the drawings, wherein like reference characters designate like or corresponding parts throughout the views, embodiments of the present invention will be described below with reference to the accompanying drawings. FIG. 1 shows a color copying machine 100. The color copying machine 100 comprises a first central processing unit (CPU) 101 for controlling the whole color copying machine, a scanner 102 for reading a color image and generating color image data, and a printer 103 for forming the color image in accordance with the color image data. The scanner 102 and the printer 103 send/receive the image data to/from an external apparatus such as a memory unit 200 through an interface (I/F) 220 in accordance with an instruction from the first CPU 101.

The structure of the memory unit 200 will be described below in detail. A color converter 201 receives RGB data through an interface 220 and performs linear transformation of the RGB data in accordance with Equation (1) to YCrCb data which are lightness/chromaticity data.

$$\begin{pmatrix} Y \\ Cr \\ Cb \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix}. \quad (1)$$

Conversely, when the data is outputted to the color copying machine 100 through the interface 220, the color converter 201 performs the linear transformation of the YCrCb data in accordance with Equation (2) to convert the YCrCb data to the RGB data.

$$\begin{pmatrix} R \\ G \\ B \end{pmatrix} = \begin{pmatrix} b_{11} & b_{12} & b_{13} \\ b_{21} & b_{22} & b_{23} \\ b_{31} & b_{32} & b_{33} \end{pmatrix} \begin{pmatrix} Y \\ Cr \\ Cb \end{pmatrix}. \quad (2)$$

Next, a background remover 202 corrects a highlight area of Y data in the YCrCb data obtained by the color converter 201 by using a background removal table (refer to FIG. 2) so as to convert the highlight area to white data.

An attribute discriminator 203 discriminates the attributes of Y'CrCb data subjected to background removal by the background remover 202, in units of 8*8 pixels. An attribute memory 205 stores 2-bit attribute data obtained by attribute discrimination of every 8*8 pixels of the image of the document by the attribute discriminator 203. The attribute memory 205 comprises two independent accessible banks. A bank signal 1 outputted from a second CPU 209 determines which bank the data is written to. The attribute counters corresponding to the attributes are included in the attribute discriminator 203. The attribute counters count the numbers of attributes for each page. The second CPU 209 can read out results of the counts.

Attributes to be discriminated are white background attribute, black character attribute, uniform attribute, monochrome attribute and color attribute. It should be noted that the monochrome attribute and the color attribute are stored as another attribute. Macro discrimination is also performed for correcting a target attribute in accordance with peripheral attributes in order to correct erroneous attribute discrimination. When it is decided according to the result of the attribute discrimination that an image of an document of one page is substantially composed of a color image, a secondary compression ON/OFF signal is set to OFF and a color/monochrome signal is set to "color". When it is decided according to the result of the attribute discrimination that the image of the document has little color attribute, the secondary compression ON/OFF signal is set to ON and the color/monochrome signal is set to "monochrome" (refer to FIG. 15).

A GBTC encoder 204 performs fixed-length, GBTC coding (a primary coding) of the Y'CrCb data, on which the background has been removed, in the units of 8*8 pixels. In GBTC, 16-byte image data of 4*4 pixels is basically encoded to 6-byte image data. Therefore, a compression ratio is 3/8 regardless of the type of the image of the document. The GBTC encoder 204 encodes Y' data without changing the resolution and encodes CrCb data at the of resolution of the subsampling. As a result, the original image data (8*8*3=192 bytes) is encoded to data of 6*4+6+6=36 bytes. The compression ratio is therefore 1/5.33 regardless of the type of the image of the document. The coded data is written to a GBTC compression memory 206. Conversely, in GBTC decoding, the encoded data is read out from the GBTC compression memory 206 and then decoded to generate the original Y'CrCb data. It is determined in accordance with a bank signal 3 outputted from the second CPU 209 which of the two banks the data is read out from. In the decoding, the image can be rotated in the units of 90° by changing the address of the GBTC compression memory 206 from which the code data is read out.

The GBTC compression memory 206 is a memory device for storing data compressed by the GBTC encoder 204. The GBTC compression memory 206 comprises two independently accessible banks. Which bank is accessed is determined in accordance with bank signals 1 and 3 outputted from the second CPU 209.

A secondary compression section 207 reads out the attribute data and the GBTC code data from the attribute memory 205 and the GBTC compression memory 206, respectively. Then, the secondary compression section 207 switches the coding method in accordance with the attribute data and a color/monochrome signal set by the second CPU 209. A secondary compression memory 208 comprises a collection of memory devices composed of a plurality of semiconductor chips. The data encoded by the secondary compression section 207 is stored in the secondary compression memory 208 and can be written or read out in the units of page at random. The location in which the data is stored is determined in accordance with an instruction from the second CPU 209. It is determined in accordance with an instruction from the second CPU 209 or the first CPU 101 which page in the secondary compression memory 208 the data is read out at.

The second CPU 209 controls the whole memory unit 200. In concrete, the following processing is performed for processing the blocks. For the background remover 202, a background removal table is set. For the attribute discriminator 203, attribute counters (refer to FIG. 3) in an attribute counter section 2038 are reset, attribute count data are read from the attribute counters, and a bank which the data is to be written to is specified in the attribute memory 205 in accordance with a bank signal 1. The GBTC code processor 204 is instructed to perform GBTC compression/expansion and to rotate the image, and the bank which the data is to be written to or read from is specified in the GBTC compression memory 206 in accordance with the bank signals 1 and 3. To the secondary compression section 207, it is instructed to perform secondary compression/expansion, image data is read and written, the bank of the attribute memory 205 which the data is to be read out from is specified in accordance with a bank signal 2, the bank of the GBTC compression memory 206 which the data is to be written or read out to/from is specified in accordance with the bank signal 2, it is instructed which location in the secondary compression memory 208 the data is written to, it is instructed which location in the secondary compression memory 208 the data is read out from, it is instructed on operation mode, and the data is read from and written to the memories (through the secondary compression section 207). That is, the data is read from and written to the attribute memory 205, the data is read from and written to the GBTC compression memory 206, and the data is read from and written to the secondary compression memory 208. In the instruction on the operation mode to the secondary compression section 207, in accordance with the secondary compression ON/OFF signal, it is switched whether or not the data is secondarily compressed when the data is stored in the secondary compression memory 208, and it is also switched whether or not the attribute data is subjected to the secondary compression. Further, in accordance with the color/monochrome signal, a secondary compression method is switched for storing the data in the secondary compression memory 208, and it is also switched whether or not the attribute data is made compact.

A working RAM 210 is a working RAM used when the second CPU 209 performs an operation. In order to effectively manage the secondary compression memory 208, the working RAM 210 holds following two types of information: (1) information about the image data of the document held in the secondary compression memory 208 (this information is used to determine an operation mode of the GBTC encoder 204 and the secondary compression section 207), i.e., the image size, the attribute data write address, the secondarily-compressed data write address, the color/monochrome information, the information about whether or not the data is secondarily compressed and the background removal table information; and (2) the information about the writable area in the secondary compression memory 208 (this information is used to determine the address at which the secondary compression section 207 writes the data into the secondary compression memory 208), i.e., a 1-bit write enable/disable flag for each of the areas into which an image memory is divided in the units of a few KBs. (A free area can be searched at high speed, because the capacity of the memory size of the area to be retrieved can be reduced by the use of the writable area information.)

Through the interface 220 between the color copying machine 100 and the memory unit 200, the image data and commands about the input/output of the image data are sent and received via an image bus and via a serial communication bus, respectively.

Figure 2:
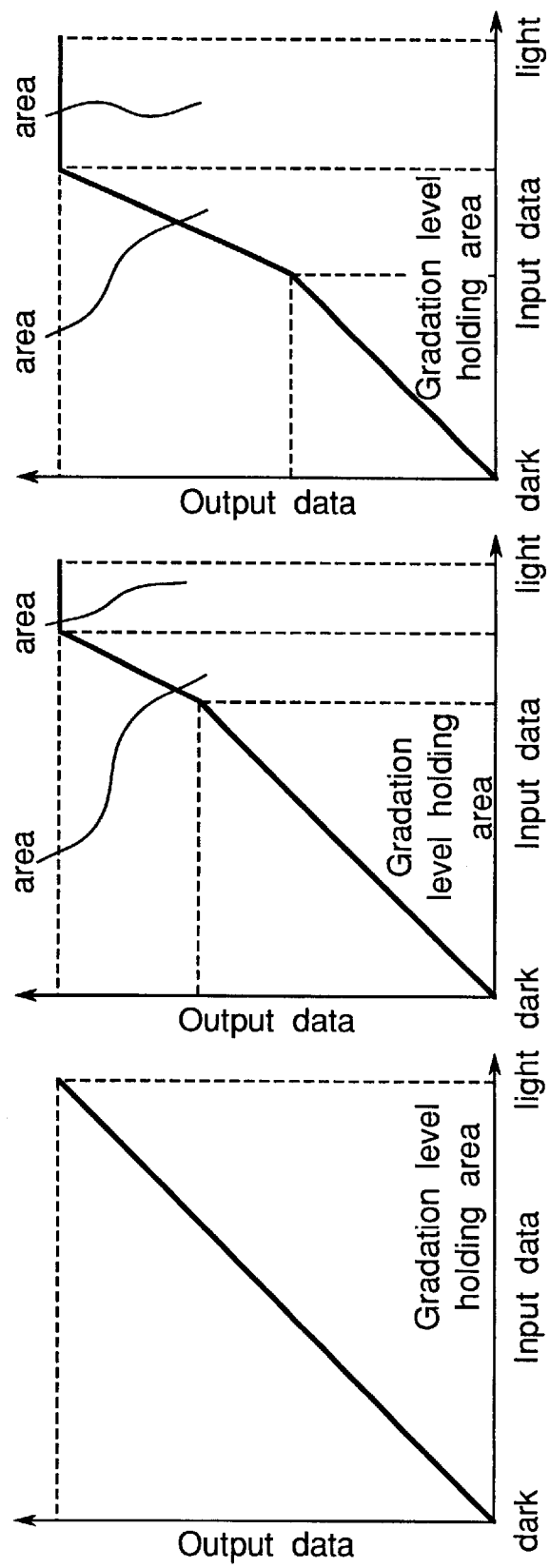
FIGS. 2A, 2B and 2C are graphs of tables for background removal.

FIG. 2 shows three examples of the background removal table as a lookup table to be used in the background remover 202. The content in the table can be rewritten by the second CPU 209. Because the content of the table can be rewritten, the setting not to perform background removal is also possible. Y'CrCb data whose background have been removed is sent to the attribute discriminator 203 and the GBTC encoder 204.

The lookup table has three areas: "a gradation level holding area" in which input and output signals are exactly equal to each other; "a gradation level correction area" in which a relationship between input and output signals can be expressed by a linear equation; and "a background removal area" in which when the input signal exceeds a predetermined value, it is changed to the white background data. FIG. 2A shows the background removal table in which the background removal is not performed, FIG. 2B shows the background removal table in which the background removal is performed, and FIG. 2C shows the background removal table in which an amount of background removal is increased. When the background removal table shown in FIG. 2A is used, the image quality is best and the compression ratio is low. When the background removal table shown in FIG. 2C is used, the largest area is recognized as the white background, the compression ratio is highest and the image quality becomes worse. As will be explained later with reference to FIG. 10, the background removal table (or the amount of background removal in the background remover 202) can be changed by the second CPU 209. By controlling the amount of background removal in a highlight area with the background removal table, whereby the compression ratio and the image quality can be selectively changed.

As explained above, the attribute discrimination and the image encoding are performed after the background is removed. The second compression section 207 substitutes the white background for portions discriminated as white background areas. The white background attribute is discriminated only in cases where the data after the background removal agree with the white background. Therefore, when the white background is substituted for portions discriminated as white background areas, no data are dropped out for the data after the background removal. That is, the white background portions after the background removal holds their complete information on encoding, and the discontinuity in density in highlight portions disappears.

Further, because the background removal table can be changed, image quality and compression ratio can be controlled according to the amount of background removal. For example, for a document such as a conventional business document where image reproduction at highlight portions is not important, the background removal is performed before the compression. Then, color image data of a plurality of sheets of paper can be stored in an image memory with a relatively small capacity, and an image is recovered without artificial feeling at highlight portions in the reproduced image.

On the other hand, in a document such as a photograph document where image reproduction at highlight portions is important, an area ratio of document image areas in an entire document image is generally large. Therefore, when an area ratio of color area or monochrome half-tone area is high in the attribute counts of the attribute discrimination, the document is guessed to be a photograph document. In such a case, it is desirable to regard the gradation reproduction as important even though the compression ratio is decreased a little, rather than to sacrifice the gradation reproduction while increasing the compression ratio somewhat. Then, it is controlled not to perform the background removal. In other words, when it is desirable to reproduce subtlety of highlight portions truly, the amount of background removal is decreased or the background removal is not performed, so that the image is reproduced truly though the compression ratio is not improved. Because for a document image the background removal is not performed, the image at highlight portions can be held.

Further, when the amount of background removal is changed, image input can be requested again to the scanner 102 if necessary (for example, S856 in FIG. 16).

Figure 3:
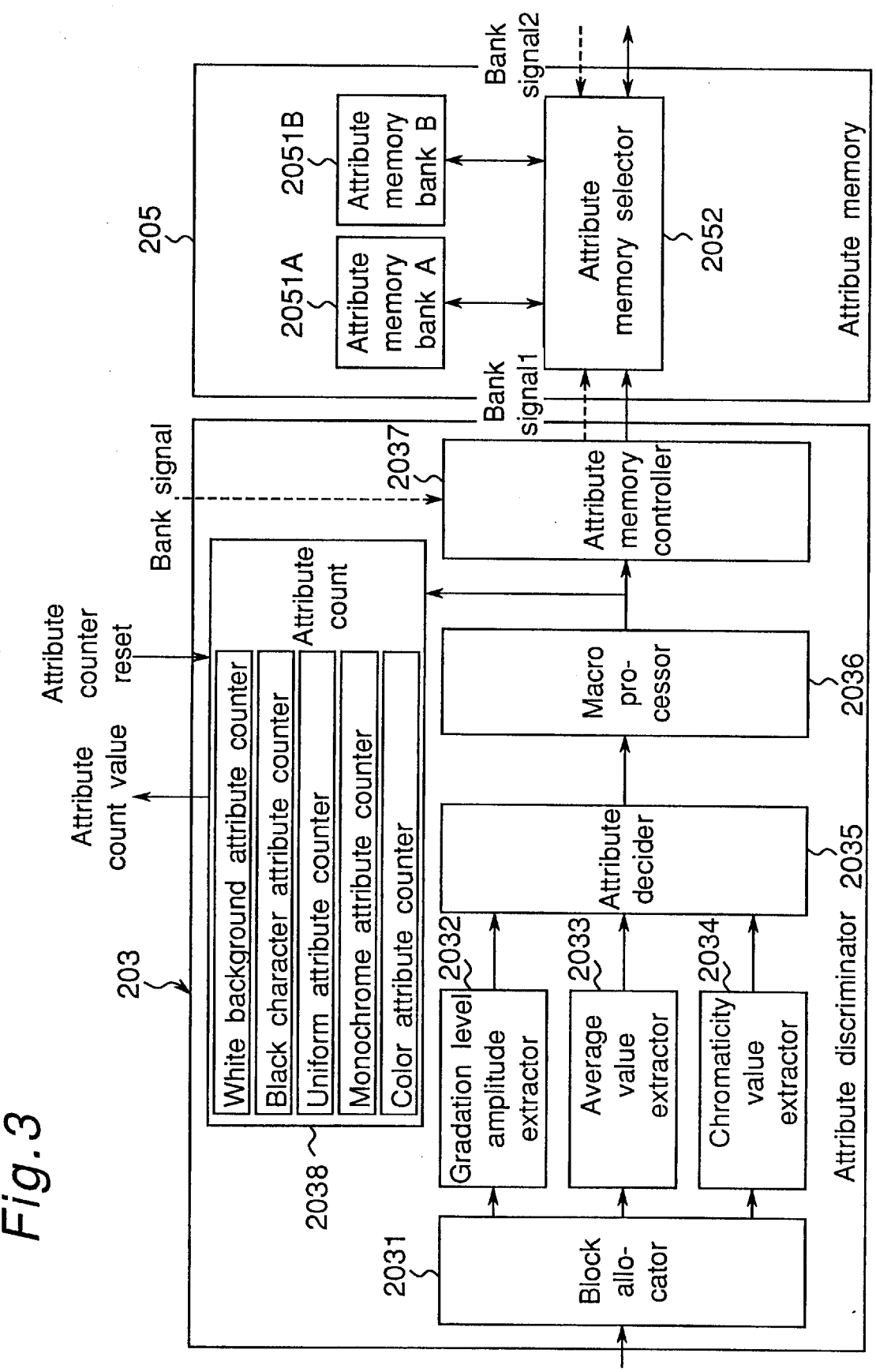
FIG. 3 is a block diagram of an attribute discriminator and an attribute memory.

FIG. 3 shows details of the attribute discriminator 203 and the attribute memory 205. In the attribute discriminator 203, a block allocator 2031 allocates and outputs the input Y'CrCb data in the form of block data in the units of 8*8 pixels. A gradation level amplitude extractor 2032 determines a minimum value and a maximum value in the image data of 64 pixels of the Y' data in a block allocated by the block allocator 2031. Then, a gradation level amplitude extractor 2032 outputs difference data between the minimum and maximum values. It can be determined in accordance with the extracted gradation level amplitude data whether or not an edge image or a uniform image is present in the block. An average value extractor 2033 determines the minimum value and the maximum value in the image data of 64 pixels of the Y' data in a block allocated by the block allocator 2031. Then, the average value extractor 2033 outputs average value data of the minimum and maximum values. It can be determined in accordance with the extracted average value data whether an average gradation level is high or low in the block. A chromaticity value extractor 2034 determines and outputs the maximum value of the chromaticity data from the image data of 64 pixels of Cr data and Cb data in a block allocated by the block allocator 2031. It can be determined in accordance with the extracted chromaticity value data whether or not the color image is present in the block.

An attribute decider 2035 determines the attribute of a target block in accordance with the gradation level amplitude data extracted from the gradation level amplitude extractor 2032, the average value data extracted from the average value extractor 2033 and chromaticity value data extracted from the chromaticity value extractor 2034. In this embodiment, the following decision conditions are used as an example. The attribute is decided as "white background attribute" when the gradation level amplitude data is equal to or smaller than a predetermined value (a uniform image), the average value data is equal to or larger than a predetermined value (a low gradation level), and the chromaticity value data is equal to or smaller than a predetermined value (an achromatic color). The attribute is decided as "black character attribute" when the gradation level amplitude data is equal to or larger than a predetermined value (an edge image) and the chromaticity value data is equal to or smaller than a predetermined value (an achromatic color). The attribute is decided as "uniform attribute" when the attribute is not the white background attribute and the gradation level amplitude data is equal to or smaller than a predetermined value (a uniform image). The attribute is decided as "monochrome attribute" when the chromaticity value data is equal to or smaller than a predetermined value (an achromatic color) and the attribute is not any of the above three attributes. The attribute is decided as "color attribute" when the attribute is not any of the above four attributes.

Though the monochrome attribute and the color attribute are discriminated from each other in order that they are counted by the attribute counter, both of the monochrome attribute and the color attribute are written to the attribute memory 205 as "others attribute". Since the number of attributes is thus four, the attribute data can be expressed with two bits. If the number of attributes is five, a 3-bit attribute code is needed and a complicated data rearrangement is also required. The color and monochrome attributes are discriminated in the units of page. Consequently, no trouble occurs even if the number of attributes is four. If the attribute is decided as color in the discrimination of the color and monochrome attributes, the "others attribute" is treated as the "color" attribute. When the attribute is decided as monochrome, the "others" attribute is treated as the "monochrome" attribute.

A macro processor 2036 corrects the attribute of a target block in accordance with the attributes of peripheral blocks, when the attribute of the target block obtained by the attribute decider 2035 is unnatural relative to the peripheral attributes.

An attribute counter section 2038 counts the number of blocks belonging to the final attributes obtained with the correction by the macro processor 2036. The attributes to be counted are of five types: the white background attribute, the black character attribute, the uniform attribute, the monochrome attribute and the color attribute. The respective counters are provided for the attributes. Attribute count values can be read by the second CPU 209. The second CPU 209 resets the attribute counters before scanning of a document. The attribute count values are read out after the scan of the document is completed, and the ratios of the attributes for the scanned document are determined. Moreover, the second CPU 209 performs an operation based on the attribute count values, to previously know an effect of the compression performed by the secondary compression section 207. Furthermore, it is possible to know the size of the codes which are secondarily compressed by the secondary compression section 207. Thus, the second CPU 209 can calculate an optimum write start address of the secondary compression memory 208 prior to the compression by the secondary compression section 207.

An attribute memory controller 2037 indicates a bank of the attribute memory which the data is to be written to, in accordance with the bank signal 1 sent from the second CPU 209. The 2-bit attribute of each block is also converted into a data unit of 8 bits because it is advantageous to write the attribute data to the attribute memory 205.

Next, the attribute memory 205 will be explained. An attribute memory selector 2052 selects whether an attribute memory bank A (2051A) or an attribute memory bank B (2051B) is selected in accordance with the bank signal 1 sent through the attribute memory controller 2037. The attribute memory bank A (2051A) and the attribute memory bank B (2051B) are each composed of SRAM of 1 megabits and can store the attribute data on the image of one page of document. The attribute memory banks A (2051A) and B (2051B) can independently read and write the attribute data.

Next, the switching will be described of variable-length compression methods in accordance with the result of the attribute discrimination. One variable-length coding method is switched to another in response to the result of the attribute discrimination so as to increase the compression ratio. If necessary, the attribute of the whole image of one page is decided and then one variable-length compression method is switched to another.

For example, a document having a large amount of character image and white background has an extremely low ratio of the other attributes to the white background attribute. When the document is decided to have a high ratio of the white background attribute to the whole document according to the attribute discrimination in the units of page, the color/monochrome signal is set to the monochrome and the secondary compression ON/OFF signal is set to ON. In this case, the attributes are of two types: the white background and others. The attribute data is expressed as 1-bit attribute data, and the number of attribute data is reduced by half. Usually, following four attributes are discriminated in the attribute discrimination for a color image: "white background", "black character", "uniform image" and "others". The 2-bit attribute data is needed in order to express the four attributes in the units of block. What ratio the attributes bear to the image of a document can be decided by counting the attributes by the attribute counters. It can be known by the attribute counters whether or not the document has a large amount of the character image and the white background. If the document has a large amount of the character image and the white background, the ratio of the other attributes to the white background attribute is extremely low. Then, in the attribute discrimination for a document having a large amount of the character image and the white background, only "white background" attribute and "others" attribute are discriminated. Then, the attribute data can be expressed as 1-bit data, and a capacity of the attribute memory can be reduced by half. In this case, the size of the secondary compression data is only slightly increased because the areas which should be originally classified as "black character" and "uniform image" are also decided as "others". However, the data size is a little increased because the areas of "black character" and "uniform image" attributes have a sufficiently low ratio to the whole document image. If an amount of the increase in data size is larger than that of the attribute data reduced by half as mentioned above, this situation can be previously known by the count values of the attribute counters. In this case, it is unnecessary to reduce the attribute data by half. When the capacity of the attribute memory is reduced by half, the ratio of the attribute memory to the secondary compression data can be reduced and, as a result, a high compression ratio can be achieved.

Similarly, the variable-length coding is not performed when a local area of color image data may be erroneously decided as a different attribute. That is, when the result of the attribute discrimination is decided in the units of page and a predetermined condition is satisfied for the attribute count values obtained by the attribute discrimination for each block, the operation mode of second coding means is switched to another mode in all the blocks in the image of one page. Thereby, image noises are not produced even when a local area of color image data is erroneously decided as other attributes. In concrete, the number of the attributes of the image of a document are known by the attribute counter section 2038 by counting the numbers of the attributes discriminated by the attribute discriminator 203. When the numbers of the attributes satisfy a predetermined condition, for example, when the ratio of the color attribute to the whole image is equal to or larger than 50% or when the ratio of the white background attribute to the whole is equal to or smaller than 30%, most of the document is decided to be occupied by the color image. In this case, the color/monochrome signal is set to color, and the secondary compression ON/OFF signal is set to OFF. Thus, it is determined that prevention of the deterioration of image quality has priority over a little improvement of the compression ratio. The operation mode of the secondary compression section 207 is thus switched to the mode of transferring the code data from the first compression memory 206 to the secondary compression memory 208, so that the data is not compressed with the variable-length coding.

Figure 4:
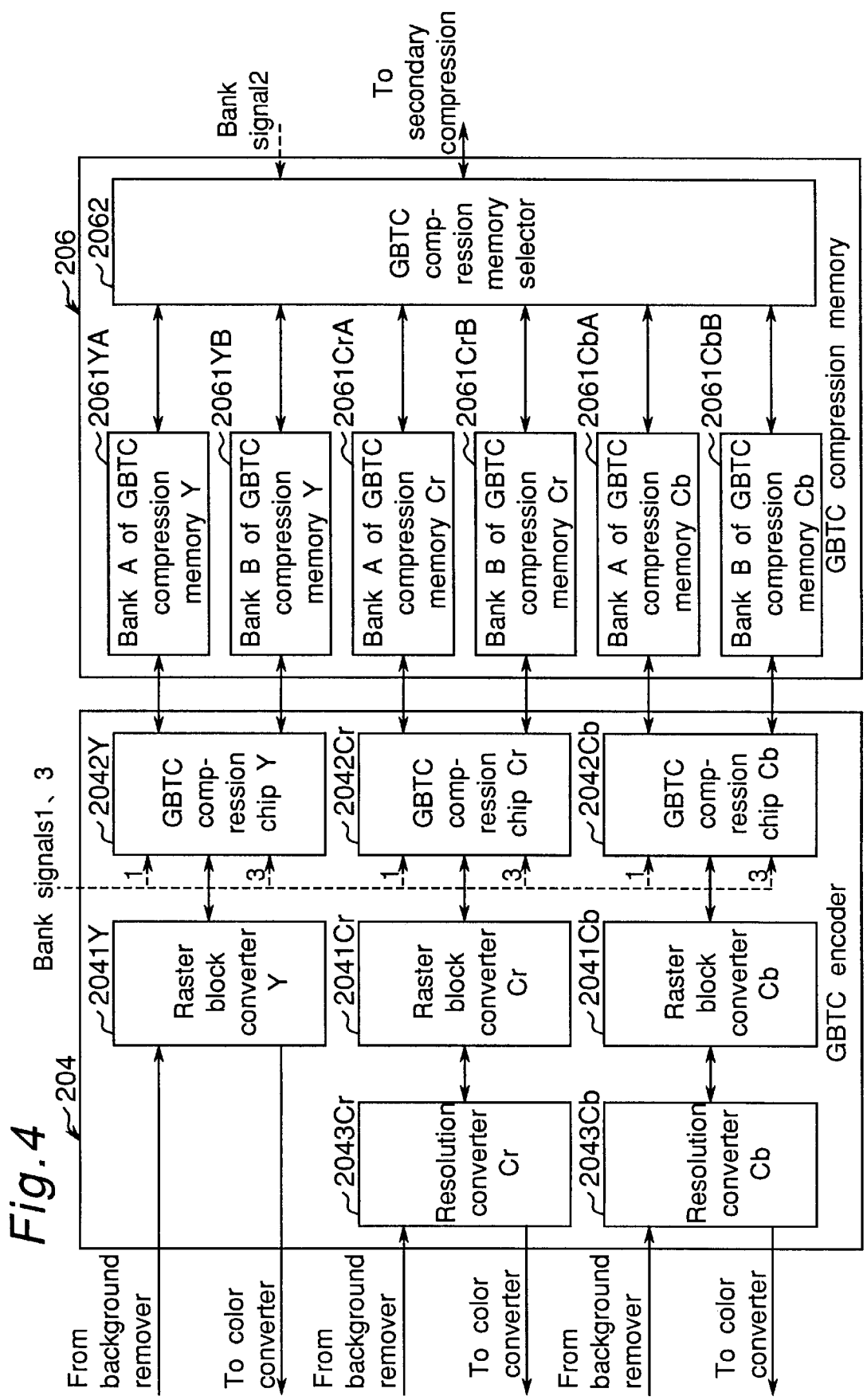
FIG. 4 is a block diagram of a GBTC encoder and a GBTC compression memory.

FIG. 4 shows details of the GBTC encoder 204 and the GBTC compression memory 206. In the GBTC encoder 204, during the compression, raster block converters Y/Cr/Cb (2041Y/2041Cr/2041Cb) convert serial data whose background have been removed to block data of 4 pixel lines. During the expansion, the converters convert the block data of 4 pixel lines to serial data.

During the compression, GBTC compression chips Y/Cr/Cb (2042Y/2042Cr/2042Cb) read the block data of 4 pixel lines, encode the data by a GBTC compression method and write the data into the GBTC compression memory 206. During the compression, access of a bank by the GBTC compression memory is controlled in accordance with the bank signal 1. During the expansion, the chips read the GBTC code data from the GBTC compression memory 206, decode the data by the GBTC compression method and convert the data into the block data of 4 pixel lines. During the expansion, a bank of the GBTC compression memory to be accessed is controlled in accordance with the bank signal 3.

During the compression, resolution converters Cr/Cb (2043Cr/2043Cb) subsample Cr/Cb data whose background have been removed, and reduce an amount of image data to ¼ to supply the data to the raster block converters 2041Cr/2041Cb. During the expansion, the resolution converters perform double interpolation of the Cr, Cb data converted into raster data. The resolution converters multiply the amount of image data four times and supply the result to the color converter 201.

The GBTC compression memory 206 (2061YA/2061YB/2061CrA/2061CrB/2061CbA/2061CbB) is a memory device for storing code data compressed by the GBTC encoder 204. The GBTC compression memory 206 comprises two independent accessible banks A and B. It is determined in accordance with the bank signal 1 outputted from the second CPU 209 whether the code data is stored in one bank or in the other bank. Each of the banks further comprises three memory devices: a memory device for storing the Y data, a memory device for storing the Cr data, and a memory device for storing the Cb data. The GBTC compression memory 206 has six memory banks in total (i.e., GBTC compression memories 2061YA/2061YB/2061CrA/2061CrB/2061CbA/2061CbB).

A GBTC compression memory selector 2062 performs a switching of which memory bank is accessed when the secondary compression section 207 accesses a GBTC compression memory 2061 comprising the six memory banks. Whether A bank or B bank of the GBTC compression memory 2061 is accessed is determined in accordance with the bank signal 2 or 3 sent from the second CPU 209. Which memory bank in the Y/Cr/Cb memory banks is accessed is determined in accordance with the order (the order of Y, Cr and Cb) which is previously determined by the secondary compression section 207.

Figure 5:
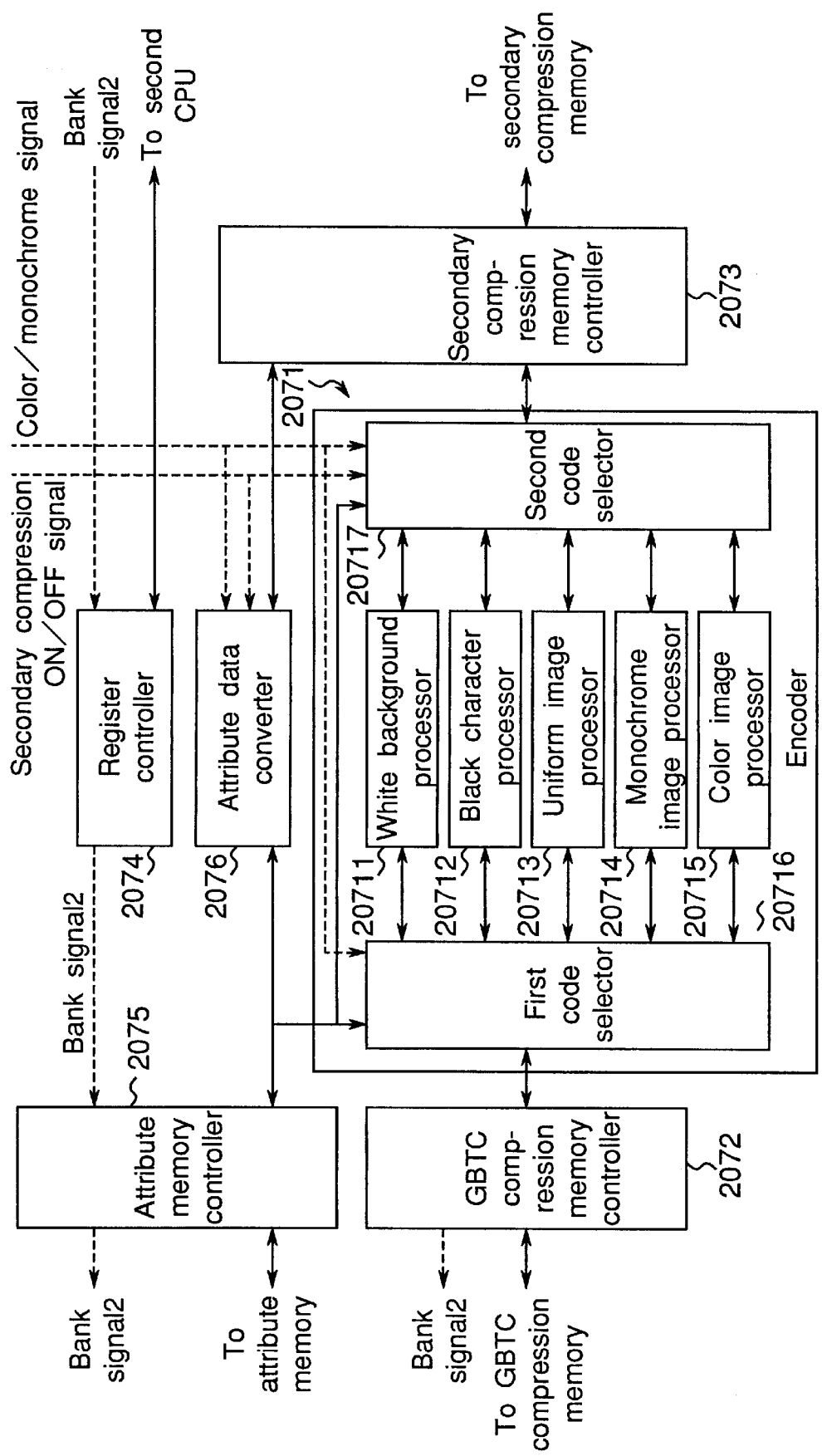
FIG. 5 is a block diagram of a secondary compression section.

FIG. 5 shows details of the secondary compression section 207. A code processor 2071 compresses GBTC-compressed data into secondarily-compressed data or conversely expands the secondarily-compressed data to the GBTC-compressed data. The code processor 2071 has six blocks further.

A first code selector 20716 switches an image bus in accordance with the attribute data supplied from an attribute memory controller 2075 and the color/monochrome signal and the secondary compression ON/OFF signal sent from the second CPU 209. On compression, it is switched to select one of secondarily-compressed data compressed by code processors 20711/20712/20713/20714/20715 for the GBTC-compressed data sent through a GBTC compression memory controller 2072. On expansion, it is switched to select GBTC-compressed data expanded by the code processors 20711/20712/20713/20714/20715.

The correspondence between the attributes and the processors is summarized below in response to the color/monochrome signal and the secondary compression ON/OFF signal sent from the second CPU 209. (a) When the secondary compression ON/OFF signal=ON and the color/monochrome signal=color, the white background attribute is sent to the white background processor 20711, the black character attribute is sent to the black character processor 20712, the uniform attribute is sent to the uniform image processor 20713 and others attribute is sent to the color image processor 20715. (b) When the secondary compression ON/OFF signal=ON and the color/monochrome signal=color, the white background attribute is sent to the white background processor 20711, the black character attribute is sent to the black character processor 20712, the uniform attribute is sent to the uniform image processor 20713 and others attribute is sent to the monochrome image processor 20714. (c) When the secondary compression ON/OFF signal=OFF, all of the white background attribute, the black character attribute, the uniform attribute and others attribute are sent to the color image processor 20715.

A second code selector 20717 switches the image bus in accordance with the attribute data supplied from the attribute memory controller 2075 and the color/monochrome signal and the secondary compression ON/OFF signal sent from the second CPU 209. On compression, the image bus is switched to select secondarily-compressed data secondarily compressed by the code processors 20711/20712/20713/20714/20715. At the time of the expansion, the image buses are switched in accordance with which of the code processors 20711/20712/20713/20714/20715 the secondarily-compressed data sent through a secondary compression memory controller 2073. The correspondence between the attributes and the processors in response to the color/monochrome signal and the secondary compression ON/OFF signal sent from the second CPU 209 is set similarly to the above-mentioned case of the first code selector 20716.

The original image data of a block of 8*8 pixels is compressed with GBTC to provide the following 36-byte data: the average value data of Y data (4 bytes), the gradation level amplitude data of the Y data (4 bytes), the code data of the Y data (16 bytes (2 bits/pixel)), the average value data of Cr, Cb data (2 bytes), the gradation level amplitude data of the Cr, Cb data (2 bytes), and the code data of the Cr, Cb data (8 bytes (2 bits/4 pixels)). The code processors 20711/20712/20713/20714/20715 deal the compressed data differently as explained below.

The white background processor 20711 does not hold the data compressed with GBTC at all (0/36 byte). Accordingly, the compression ratio of the data to the original image is $0/(8*8*3)=0/192=0$.

The black character processor 20712 holds the following data of the data compressed with GBTC (16/36 bytes): the average value data of the Y data (4 bytes), the gradation level amplitude data of the Y data (4 bytes), and the code data of the Y data (8 bytes (1 bit/pixel)). The processor 20712 holds only the upper one bit of the code data. Accordingly, the compression ratio of the data to the original image is $16/(8*8*3)=1/12=0.0833$.

The uniform image processor 20713 holds the following data of GBTC-compressed data (6/36 bytes): average value data of the Y data (1 byte), average value data of the Cr, Cb data (2 bytes), and an average value of the average value data of the Y data. Accordingly, the compression ratio of the compressed data to the original image is $6/(8*8*3)=1/32=0.03125$.

The monochrome image processor 20714 holds only the following Y data in the data compressed with GBTC (24/36 bytes): the average value data of the Y data (4 bytes), the gradation level amplitude data of the Y data (4 bytes), and the code data of the Y data (16 bytes (2 bits/pixel)). Accordingly, the compression ratio of the compressed data to the original image is $24/(8*8*3)=1/8=0.125$.

The color image processor 20715 holds all the data compressed with GBTC (36/36 bytes). Accordingly, the compression ratio of the data to the original image is $36/(8*8*3)=3/16=0.1875$.

The GBTC compression memory controller 2072 controls the address of the GBTC compression memory 206, for example, to send and receive the data between the code processor 2071 and the GBTC compression memory 206.

The secondary compression memory controller 2073 controls the address of the secondary compression memory 208, for example, to send and receive the data between the code processor 2071 and the secondary compression memory 208.

The register controller 2074 controls the whole secondary compression section 207 in accordance with an instruction from the second CPU 209.

The attribute memory controller 2075 controls the address of the attribute memory 205, for example, to send and receive the data between the code processor 2071 and the attribute memory 205.

The attribute memory data used for the switching of the code processor 2071 is required on the expansion of the secondarily-compressed data to the GBTC-compressed data. Thus, the attribute data converter 2076 converts the attribute data, obtained through the attribute memory controller 2075, in accordance with a predetermined condition. The data is then held in the secondary compression memory 208 through the secondary compression memory controller 2073.

The predetermined condition is as follows. (a) When the color/monochrome signal from the second CPU 209 indicates monochrome, the attribute data is reduced by half. Particularly, the white background attribute is taken as 0 and others are taken as 1, whereby the four attributes are simplified down to the two attributes. Thus, the attribute data originally requiring 2 bits is expressed as 1 bit. Consequently, the attribute data can be reduced by half. (b) When the color/monochrome signal from the second CPU 209 indicates color, i.e., when the attribute data indicates the color attribute, the as-received attribute data is written. (c) When the secondary compression ON/OFF signal from the second CPU 209 is OFF, i.e., when the secondary compression is not performed, the attribute data is not written because the attribute data is not needed for the expansion.

Figure 6:
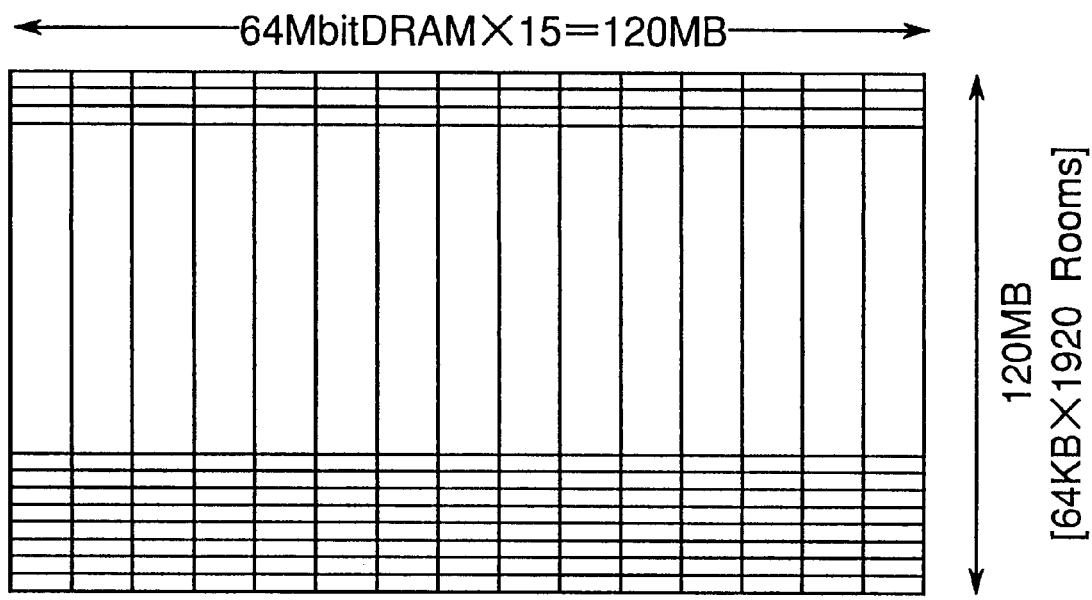
FIG. 6 is a diagram of a secondary compression memory.

Next, the control of the secondary compression memory 208 by the second CPU 209 and the working RAM 210 will be described with reference to FIGS. 6 to 8. As shown in FIG. 6, it is assumed here that the secondary compression memory 208 is a 120-MB DRAM. A 120-MB memory space is controlled in 1920 control units (hereinafter referred to as rooms) of 64 KB. The secondarily-compressed data and the attribute data of the document of one page are divided into and held in a plurality of rooms consecutively arranged on the address in accordance with the data size. The memory is controlled in such a manner that the secondarily-compressed data of a plurality of pages are not mixed in a room.

Figure 7:
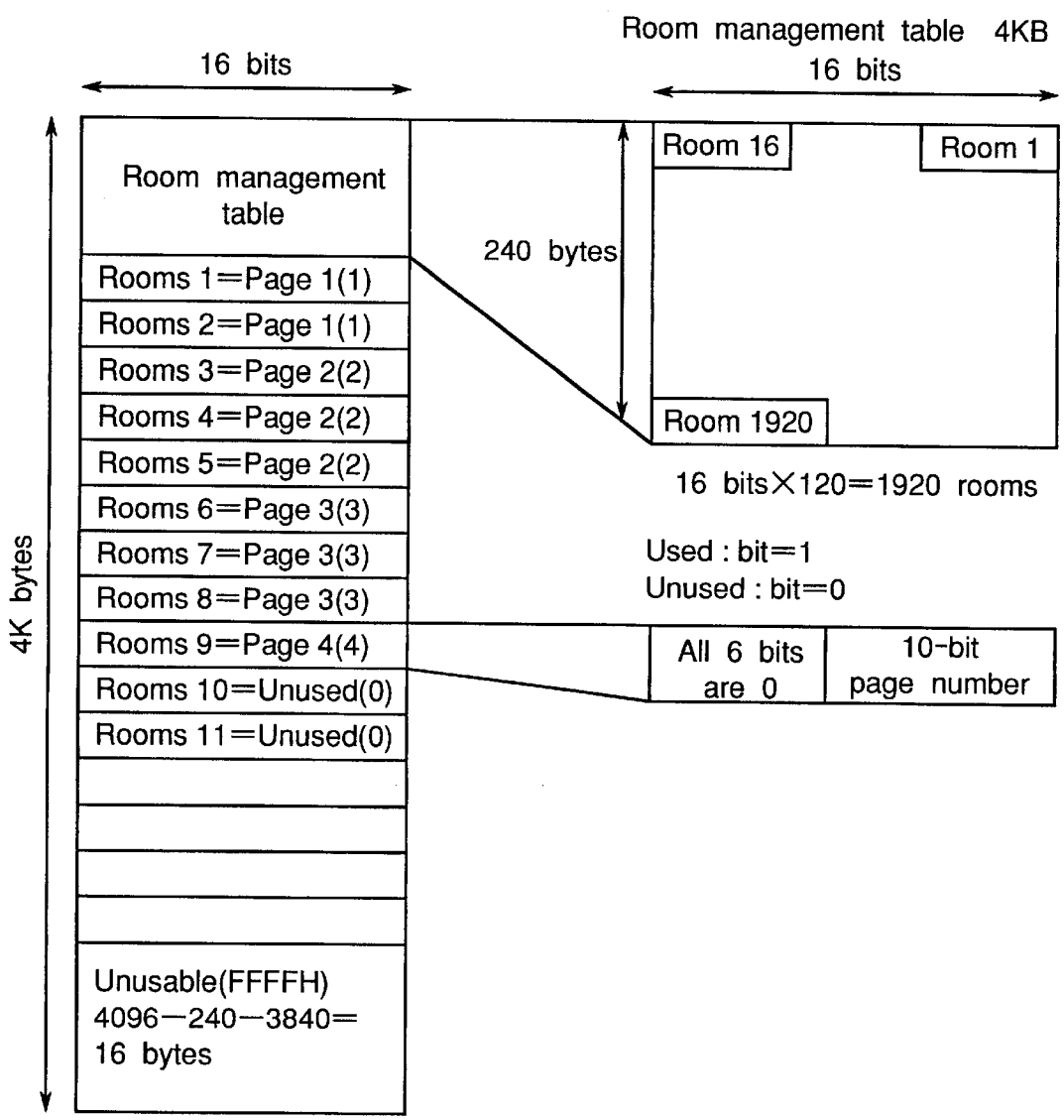
FIG. 7 is a diagram of writable information to be stored to a working RAM.

FIG. 7 shows information on a writable area in the working RAM 210. A room management table indicates whether or not the data is written to 1920 rooms by 1-bit information (1920 bits in total, i.e., 240-byte information). This room management table is used to retrieve a free area in the secondary compression memory 208 at high speed. It is indicated with 2-byte room information which page of the document is currently stored in the 1920 rooms. The location in which the data of a specified page is stored can be known by referring to the room information.

FIG. 8 shows document image data information in the working RAM 210. The working RAM 210 is assumed to be capable of managing the image data of 1024 pages at maximum. An image size, an attribute data write address, a secondarily-compressed data write address, color/monochrome information, secondary compression ON/OFF information, background removal table information and the like are stored in the working RAM 210 in the units of page.

In the above-described memory unit 200, in the system for variable-length coding, the image data of a plurality of sheets and storing the data in the compression memory, a specified page of the code data in the plurality of pages can be accessed at random and the memory can be efficiently managed. Thereby, only the data of a certain page in a series of data can be erased and new data can be stored in the erased data area. Accordingly, various image data processing can be performed.

Figure 9:
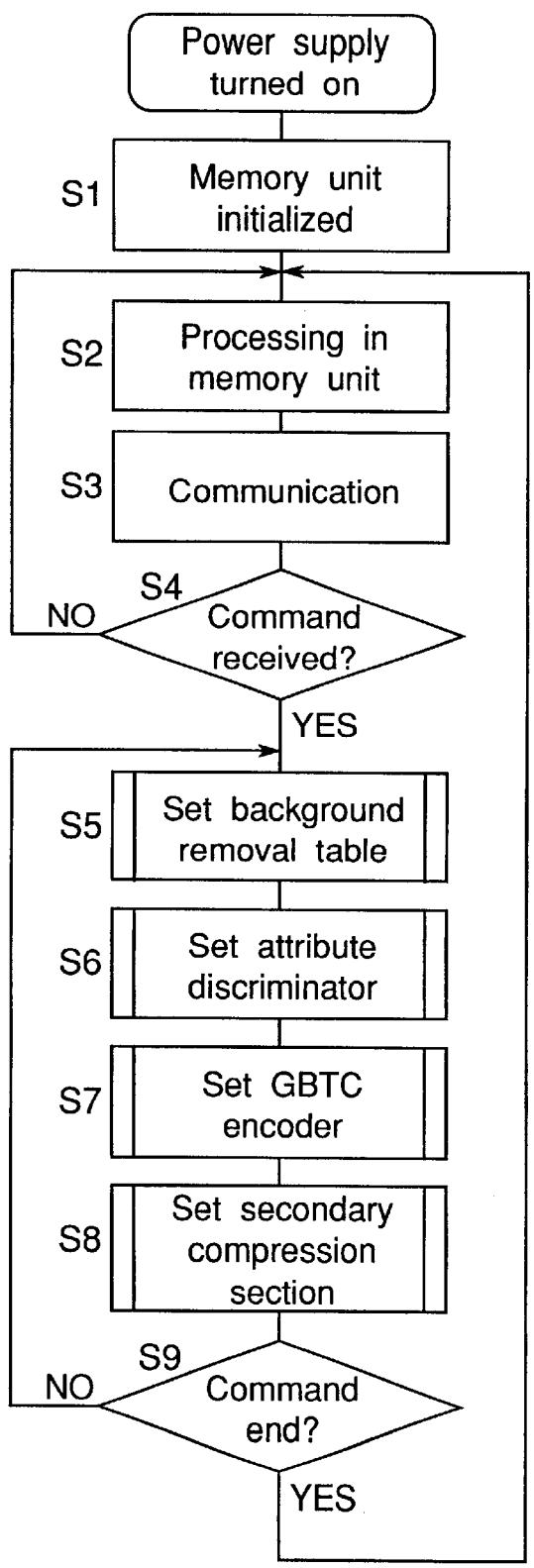
FIG. 9 is a main flowchart of memory control.

FIG. 9 shows a main flow of the memory unit 200 controlled by the second CPU 209. After a power source of the memory unit is turned on, the memory unit 200 is first initialized (step S1; the term "step" is omitted hereinafter). In concrete, a color conversion coefficient of the color converter 201 is set, the background removal table of the background remover 202 is set, an attribute discrimination condition of the attribute discriminator 203 is set, the GBTC encoder 204 is initialized, and the secondary compression section 207 is initialized.

Next, the internal processing is performed in the memory unit (S2). That is, the control in the memory unit is carried out such as a refresh of the memory and address management.

Next, communication with the first CPU 101 for controlling the color copying machine body is controlled (S3). The whole memory unit 200 is basically controlled correspondingly to a control command issued from the first CPU 101.

Next, it is determined whether or not the control command is received from the first CPU 101 (S4). Until the control command is received, the processing of steps S2 and S3 is repeated.

When the control command is issued by the first CPU 101, the background removal table is subsequently set (S5). That is, the background removal table of the background remover 202 is rewritten if necessary. The initial background removal table is used if unnecessary.

Next, the attribute discrimination condition of the attribute discriminator 203 and the bank signal 1 are set (S6). The initialized values are used if not needed to change them. The bank signal 1 is outputted once for the image of the document of a page.

Next, the GBTC encoder 204 is set (S7). In concrete, the compression/expansion condition, the image rotation of the GBTC encoder 204 and the bank signals 1 and 3 are set as needed. The compression/expansion condition, the image rotation and the bank signals 1 and 3 are outputted once for the image of the document of a page.

Next, the secondary compression section 207 is set (S8). That is, the compression/expansion conditions of the secondary compression section 207, the control of the position in which the image data is stored and the bank signal 2 are set as needed. The compression/expansion conditions, the control of the position in which the image data is stored and the bank signal 2 are outputted once for the image of the document of one page.

The processing of steps S5 to S9 is repeated until the processing of the pages determined by the control command is completed.

Figure 10:
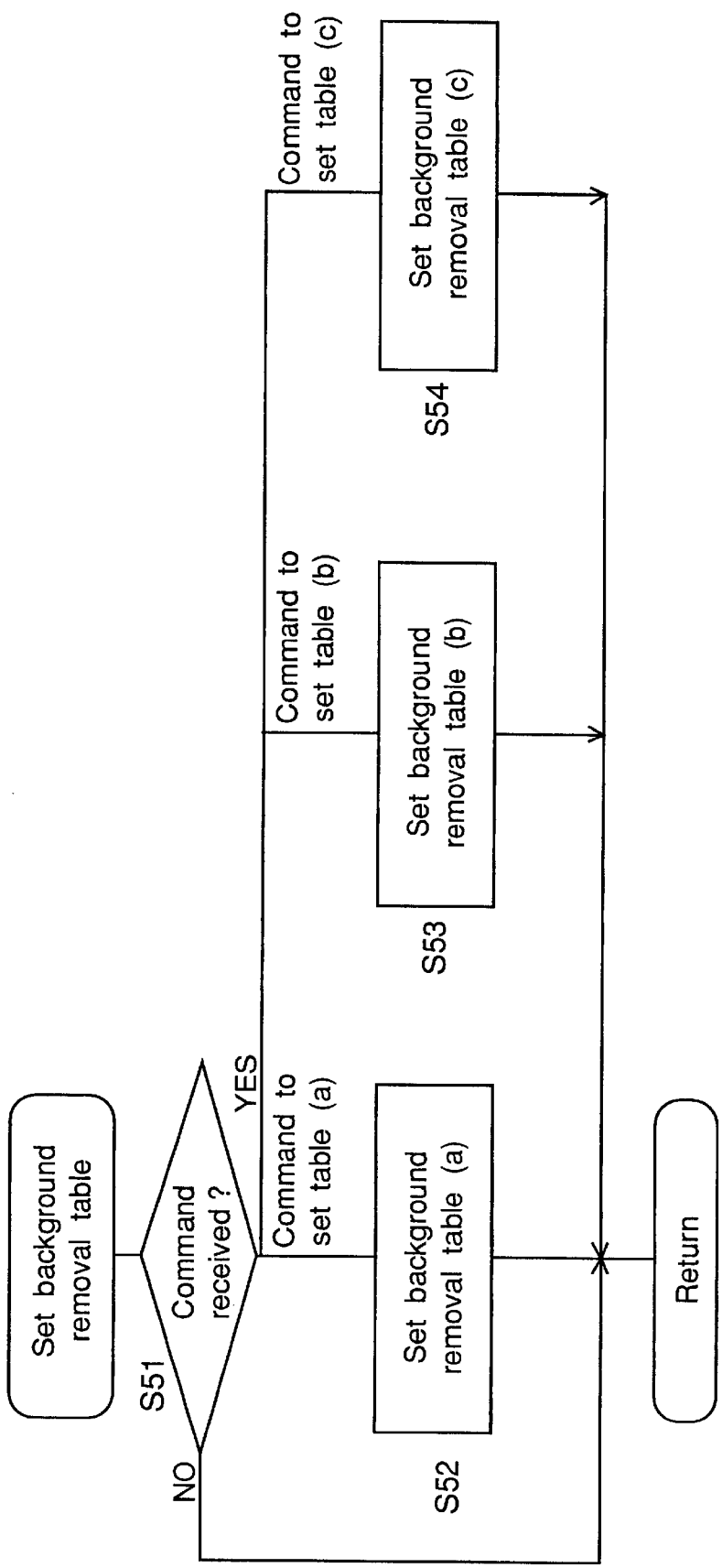
FIG. 10 is a flowchart of the setting of the background removal table.

FIG. 10 shows a flow of the setting of the background removal table (S5 in FIG. 9). First, it, is decided whether or not a command of the setting of the background removal table is received (S51). When the received command is decided to be a command to set the table (a), the background removal table (a) (refer to FIG. 2A) is set to the background remover 202 (S52). When the received command is decided to be a command to set the table (b), the background removal table (b) (refer to FIG. 2B) is set to the background remover 202 (S53). When the received command is decided to be a command to set the table (c), the background removal table (c) (refer to FIG. 2C) is set to the background remover 202 (S54).

In this embodiment, only three types of background removal tables are prepared. However, many background removal tables may be switched in accordance with applications. Although the background removal tables are switched by the first CPU 101 of the copying machine, they may be switched by the second CPU 209 for controlling the memory unit if desirable.

Figure 11:
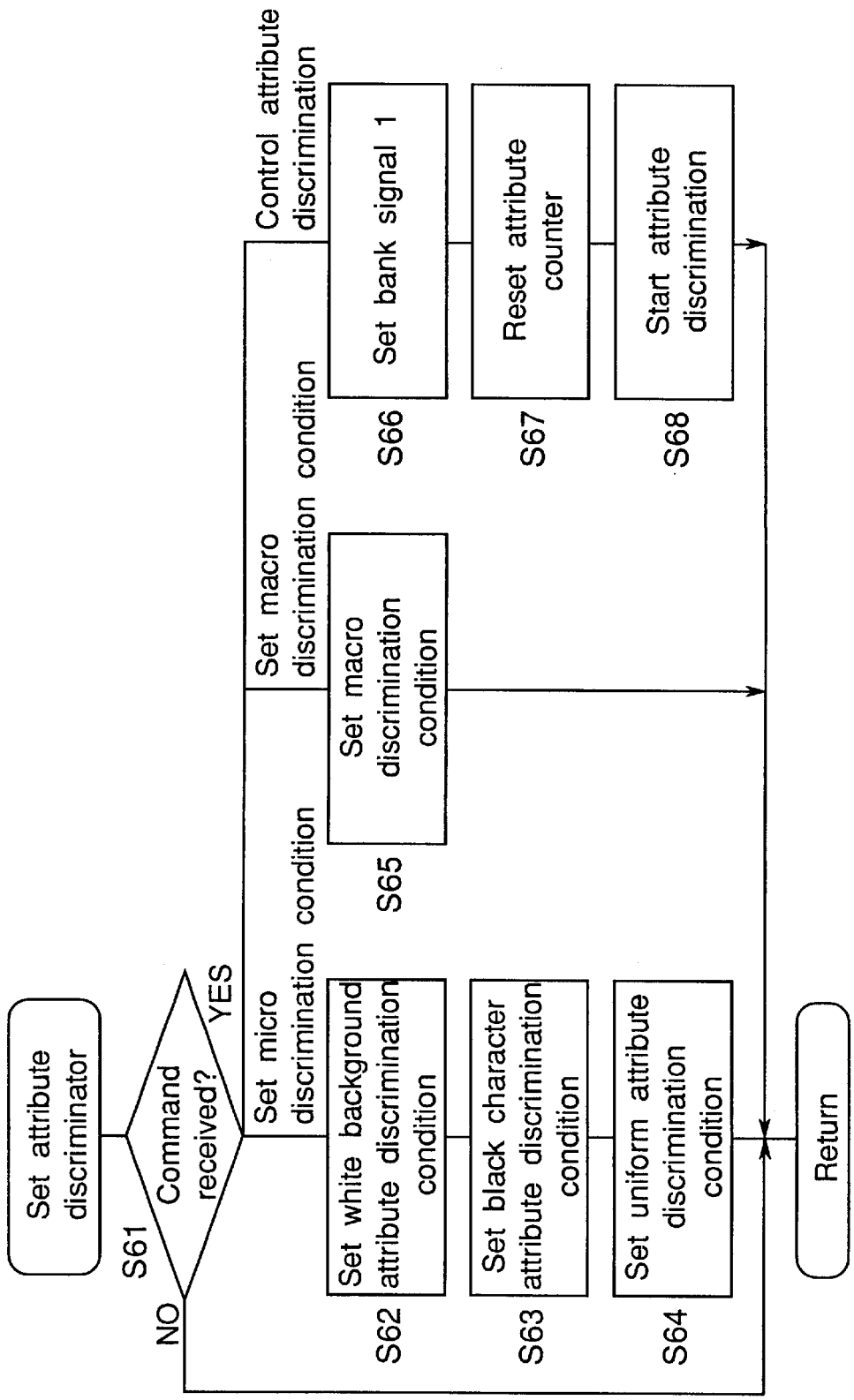
FIG. 11 is a flowchart of the setting of the attribute discriminator.

FIG. 11 shows a flow of the setting of the attribute discriminator (S6 in FIG. 9). First, it is decided whether or not the command on the setting of the attribute discriminator 203 is received (S61).

When the received command instructs the setting of a micro-discrimination condition, the attribute discriminator 203 is set to white background attribute discrimination condition (S62), black character attribute discrimination condition (S63) and uniform attribute discrimination condition (S64).

When the received command instructs the setting of a macro-discrimination condition, the attribute discriminator 203 is set to the macro-discrimination condition (S65).

When the received command is a command to control the attribute discrimination, the bank signal 1 is controlled in the units of page (S66), the attribute counter 2038 is reset (S67), and the attribute discrimination is started (S68). This processing is repeated for a series of documents. The bank signal 1 is controlled so that bank A is selected for the processing of odd pages and bank B is selected for the processing of even page. In this embodiment, the bank signal 1 is set by the second CPU 209. However, the bank signal 1 may be set by the first CPU 101 of the copying machine as needed.

Figure 12A:
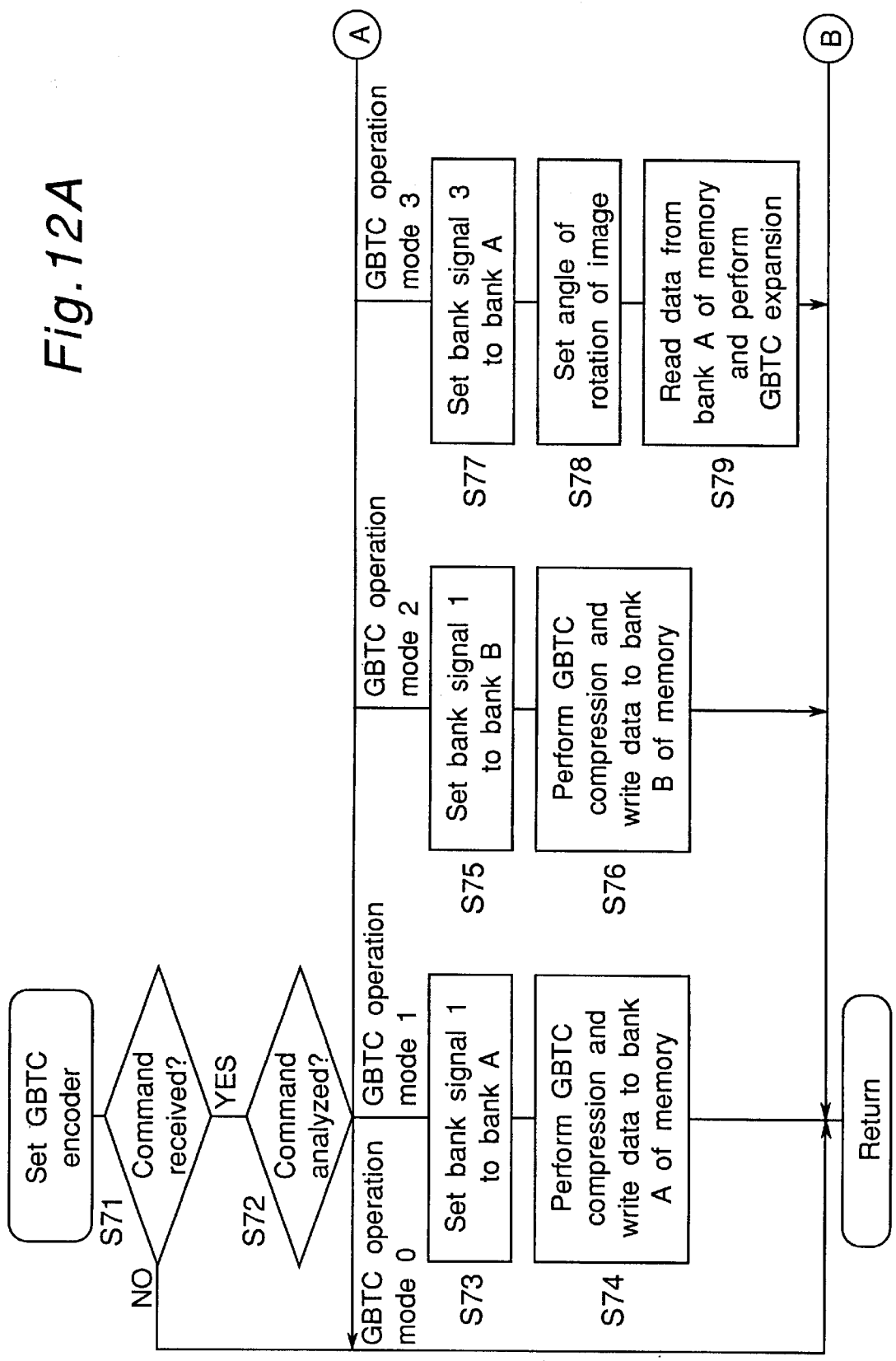
FIGS. 12A and 12B are flowcharts of the setting of the GBTC encoder.
Figure 12B:
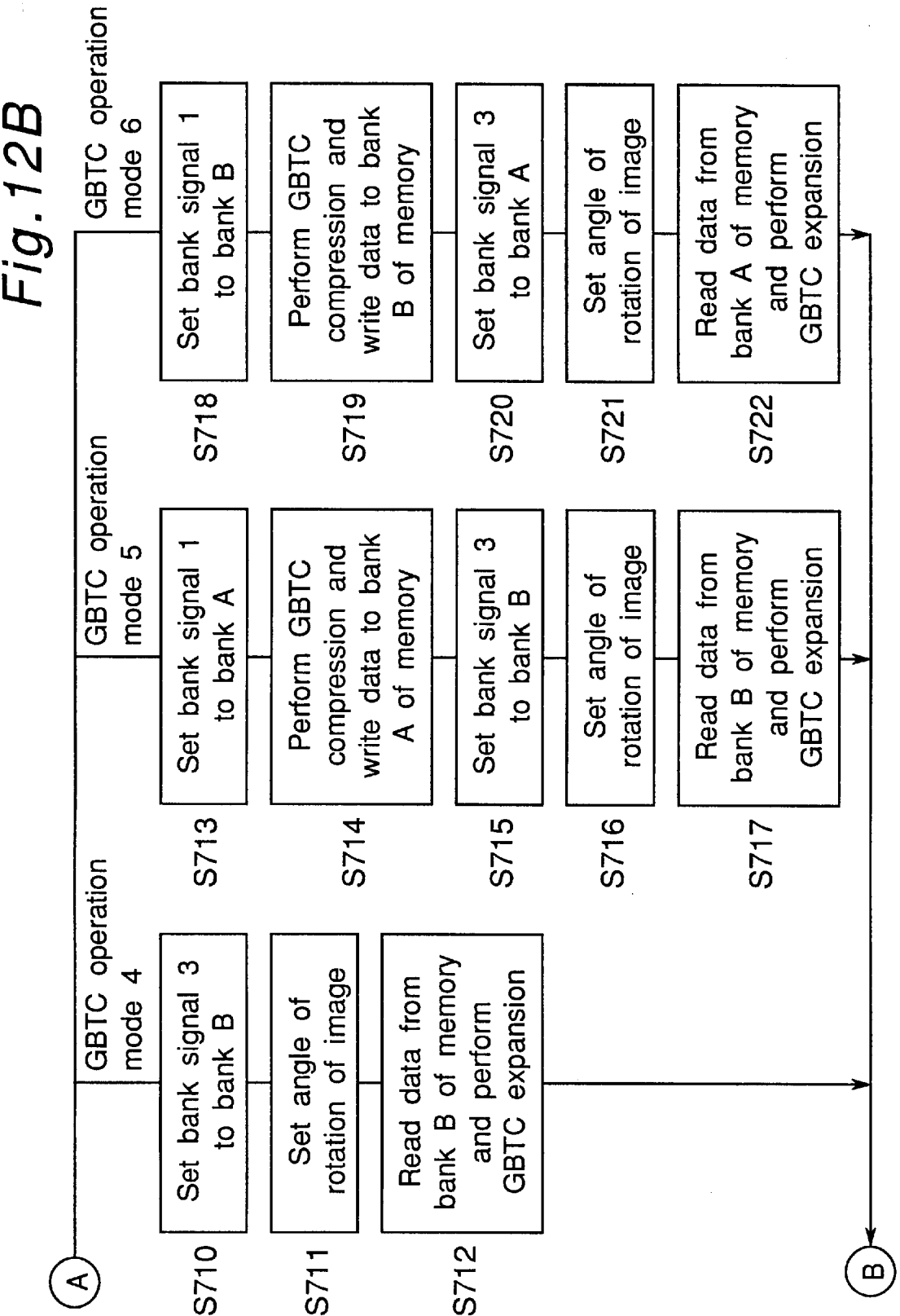

FIGS. 12A and 12B show a flow of the setting of the GBTC encoder (S7 in FIG. 9). First, it is decided whether or not the command on the GBTC encoder 204 is received (S71). The command is then analyzed correspondingly to the received command and a page which is now being processed, whereby one of GBTC operation modes 0 to 6 is selected (S72).

In the GBTC operation mode 0, the GBTC encoder 204 performs no processing. In the GBTC operation mode 1, in the GBTC encoder 204, the bank signal 1 is set to bank A in order to select bank A of the GBTC compression memory 206 (S73). Then, the GBTC compression is performed and the compressed data is written to bank A of the GBTC compression memory 206 (S74). In the GBTC operation mode 2, in the GBTC encoder 204, the bank signal 1 is set to bank B in order to select bank B of the GBTC compression memory 206 (S75). Then, the GBTC compression is performed and the compressed data is written to bank B of the GBTC compression memory 206 (S76). In the GBTC operation mode 3, in the GBTC encoder 204, the bank signal 3 is set to bank A in order to select bank A of the GBTC compression memory 206 (S77). An angle of rotation of the output image is set as needed (S78). The GBTC code data is read from bank A of the GBTC compression memory 206 and the GBTC expansion is performed (S79). In the GBTC operation mode 4, in the GBTC encoder 204, the bank signal 3 is set to bank B in order to select bank B of the GBTC compression memory 206 (S710). The angle of rotation of the output image is set as needed (S711). The GBTC code data is read out from bank B of the GBTC compression memory 206 and the GBTC expansion is performed (S712). In the GBTC operation mode 5, the simultaneous compression/expansion is accomplished by consecutively performing the processing of the GBTC operation modes 1 (S713 to S714) and 4 (S715 to S717). In the GBTC operation mode 6, the simultaneous compression/expansion is accomplished by consecutively performing the processing of the GBTC operation modes 2 (S718 to S719) and 3 (S720 to S722).

Figure 13:
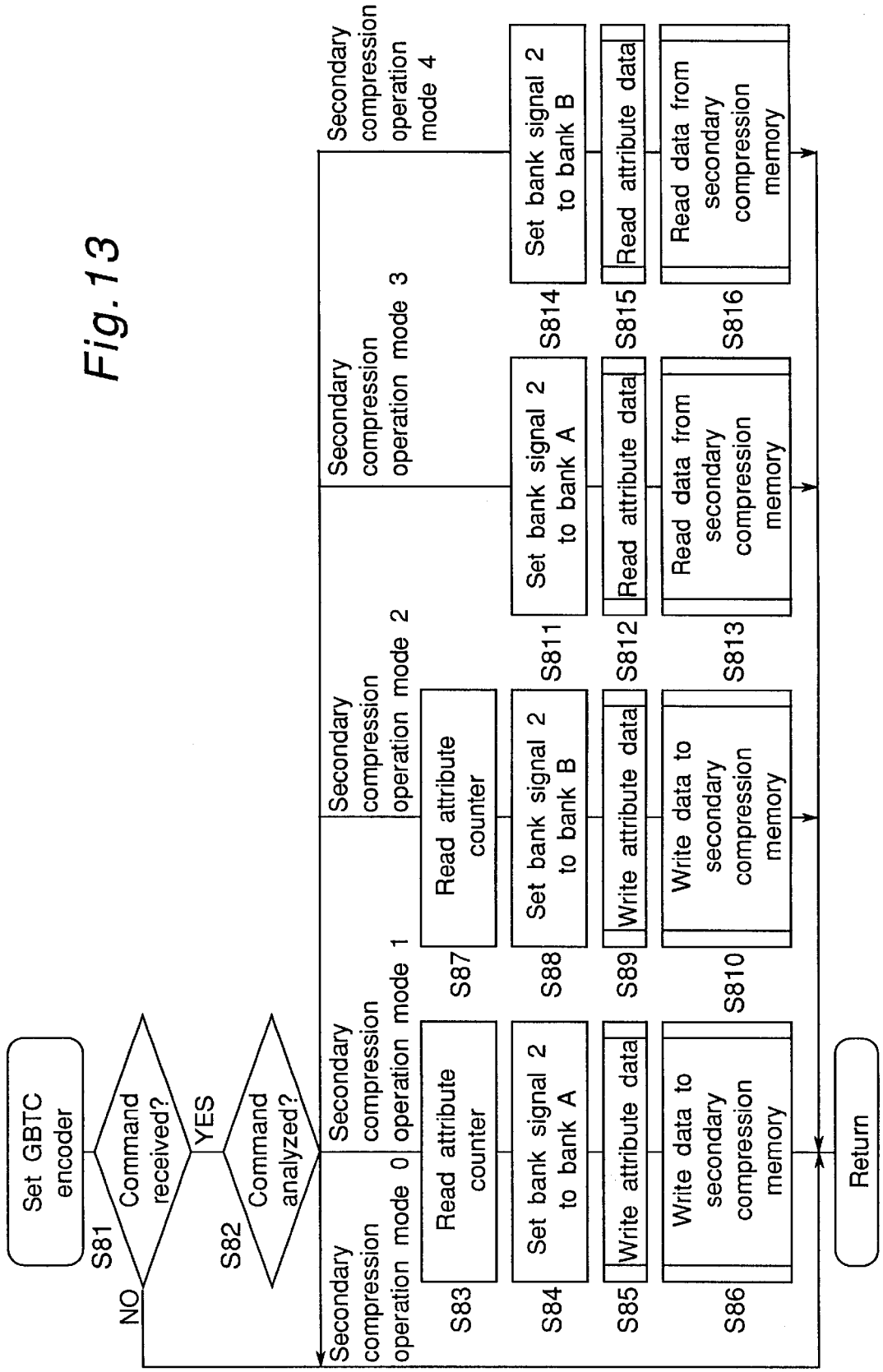
FIG. 13 is a flowchart of the setting of a secondary compression section.

FIG. 13 shows a flow of the processing of the secondary compression section (S8 in FIG. 9). First, it is decided whether or not the command on the secondary compression section 207 is received (S81). The command is then analyzed correspondingly to the received command and the page which is now being processed, whereby one of secondary compression operation modes 0 to 4 is selected (S82).

In the secondary compression operation mode 0, the secondary compression section 207 performs no processing.

In the secondary compression operation mode 1, the count values of the attributes (white ground/black character/monochrome/color) are first read from the attribute counters 2038 in the attribute discriminator 203 (S83). The bank signal 2 is set to bank A in order to access the attribute memory 205 and bank A of the GBTC compression memory 206 (S84). The attribute data written to the attribute memory 205 is then written to the secondary compression memory 208 through the secondary compression section 207 in accordance with the predetermined condition (S85). Then, the GBTC compression data written to the GBTC compression memory 206 is subjected to the secondary compression in the secondary compression section 207 in accordance with the predetermined condition, and the resultant data is written to the secondary compression memory 208 (S86).

In the secondary compression operation mode 2, the count values of the attributes (white ground/black character/monochrome/color) are first read from the attribute counter 2038 in the attribute discriminator 203 (S87). The bank signal 2 is set to bank B in order to access the attribute memory 205 and bank B of the GBTC compression memory 206 (S88). The attribute data written to the attribute memory 205 is then written to the secondary compression memory 208 through the secondary compression section 207 in accordance with the predetermined condition (S89). Then, the GBTC compression data written to the GBTC compression memory 206 is subjected to the secondary compression in the secondary compression section 207 in accordance with the predetermined condition, and the resultant data is written to the secondary compression memory 208 (S810).

In the secondary compression operation mode 3, the bank signal 2 is set to bank A in order to access the attribute memory 205 and bank A of the GBTC compression memory 206 (S811). The attribute data written to the secondary compression memory 208 is then written to the attribute memory 205 through the secondary compression section 207 in accordance with the predetermined condition (S812). Then, the secondary compression data written to the secondary compression memory 208 is subjected to the secondary expansion in the secondary compression section 207 in accordance with the predetermined condition, and the resultant data is written to the GBTC compression memory 206 (S813).

In the secondary compression operation mode 4, the bank signal 2 is set to bank B in order to access the attribute memory 205 and bank B of the GBTC compression memory 206 (S814). The attribute data written to the secondary compression memory 208 is then written to the attribute memory 205 through the secondary compression section 207 in accordance with the predetermined condition (S815). Then, the secondary compression data written to the secondary compression memory 208 is subjected to the secondary expansion in the secondary compression section 207 in accordance with the predetermined condition, and the resultant data is written to the GBTC compression memory 206 (S816).

Figure 14:
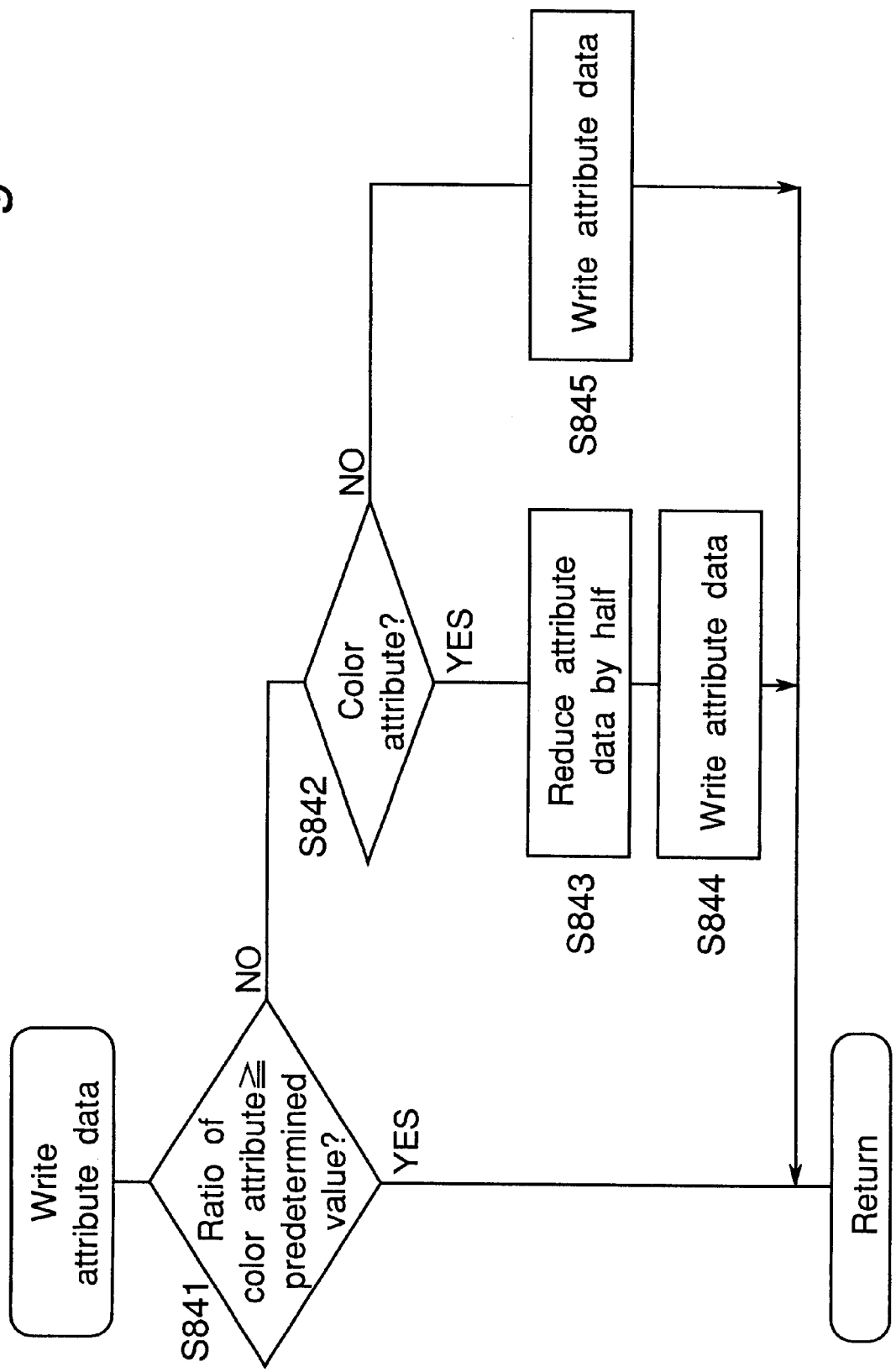
FIG. 14 is a flowchart of the write of attribute data.

FIG. 14 shows a flow of the write of the attribute data (S85, S89, S812 and S815 in FIG. 13). First, the ratio of the color attribute in the whole document is calculated from the attribute count values read out from the attribute counter 2038 in the attribute discriminator 203. Then, the processing is performed in the following three cases. Information on whether or not attribute information is reduced by half is stored in the working RAM 210 in the units of page as information on whether the target page has the color attribute or the monochrome attribute. Further, whether or not the secondary compression is performed in the secondary compression section 207 is also stored in the working RAM 210 in the units of page as the secondary compression ON/OFF signal.

(a) When the calculated ratio of the color attribute is equal to or larger than a predetermined value (e.g., 50%) (YES in S841), it is decided that most of the document images are color images such as a photogravure. Then, because the maintenance of the image quality has priority over the deterioration of the image quality caused due to the useless secondary compression, the data is written to the secondary compression memory 208 without the secondary compression in the secondary compression section 207. The attribute information is not needed, and the processing completes without writing the attribute data. At this time, the color/monochrome signal is set to color and the secondary compression ON/OFF signal is set to OFF.

(b) If the attribute count values read out from the attribute counter 2038 indicate no color attribute or little color attribute such as less than 0.1% (YES in S842), it is decided that most of the document image are monochrome images. Then, the secondarily compressed data is made compact and, in addition, the attribute data itself is reduced by half (S843). The data is written to the secondary compression memory 208 (S844). In concrete, 2-bit attribute information is normally required in order to express four attributes (white background/black character/monochrome/color) for an attribute area. However, these four attributes are reduced to two attributes (white background/others) and thereby the attribute information is expressed as 1 bit. This processing permits reducing the attribute data itself by half. It is be expected that the compression ratio is further improved in this process. At this time, the color/monochrome signal is set to monochrome and the secondary compression ON/OFF signal is set to ON.

(c) In the case of a normal business color document whose ratio of the color attribute does not satisfy the predetermined condition (NO in S842), the 2-bit attribute information is written to the secondary compression memory 208 in the normal manner in order to express the four attributes (white background/black character/monochrome/color) for an attribute area (S845). At this time, the color/monochrome signal is set to color and the secondary compression ON/OFF signal is set to ON.

The discrimination between the color and the monochrome in the units of page in accordance with the count values from the attribute counter 2038 has been described above. The color attribute, however, cannot exist when a monochrome mode is set, for example, by the operation panel (not shown). For this reason, the processing is controlled to reduce the attribute data by half (S843) and to write the attribute data (S844).

Figure 15:
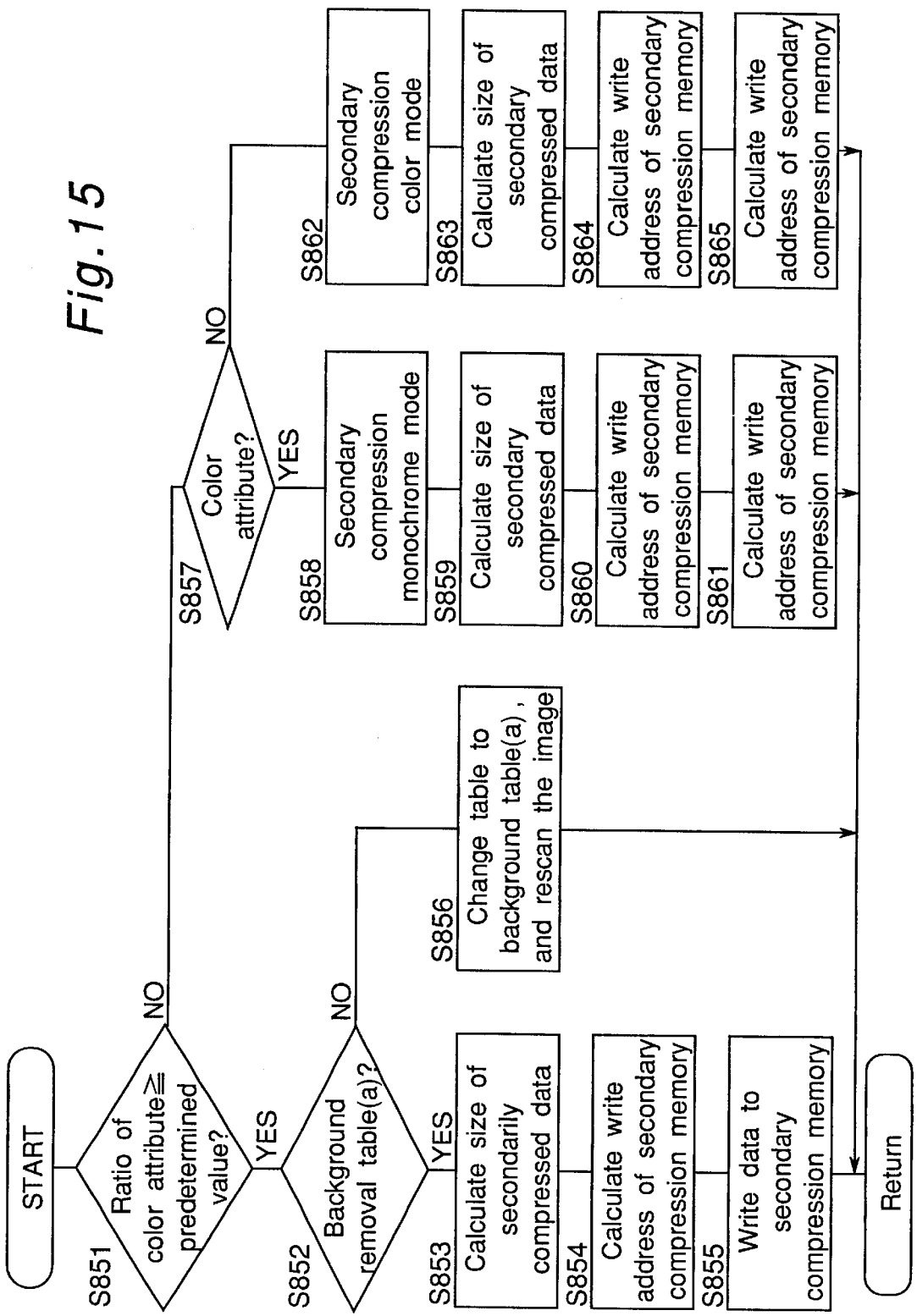
FIG. 15 is a flowchart of the write of the data to the secondary compression memory.

FIG. 15 shows a flow of the write of the data to the secondary compression memory (S86, S810, S813 and S816 in FIG. 13). The following processing corresponding to the three cases of FIG. 14 is performed.

(a) When the calculated ratio of the color attribute is equal to or larger than the predetermined value (e.g., 50%), the ratio of the color attribute to the whole document is first calculated from the attribute count values read from the attribute counter 2038 in the attribute discriminator 203.

When the calculated ratio of the color attribute is equal to or larger than the predetermined value (e.g., 50%) (S851), it is decided that most of the document images are the color images such as photogravure. Then, the maintenance of the image quality has priority over the deterioration of the image quality caused due to the useless secondary compression. Moreover, the same is true of the background removal. Thus, it is decided whether or not the background removal table (a) is currently set, i.e., whether or not the background is removed (S852). When the background removal table (a) is decided not to be set, i.e., when the background is removed, the background removal table (a) is set and an instruction to rescan the image is sent (S856). The instruction to rescan the image is given by issuing a command to send the image again to the first CPU 101 of the color copying machine. When the background removal table (a) is decided to be set, i.e., when the background is not removed, the size of the secondarily compressed data is calculated (S853). (In this case, the data size is equal to the size of the GBTC compression data). Further, the address of the secondary compression memory 208 to which the image data size can be consecutively written is calculated in accordance with the data in the working RAM 210 (S854), and the write of the data to the secondary compression memory 208 is started from the write address (S855).

(b) When the attribute count values read from the attribute counter 2038 in the attribute discriminator 203 indicate no color attribute or little color attribute (0.1% or less) (YES in S857), even data of the color attribute is subjected to monochrome coding. Thus, the operation mode of the secondary compression section 207 is set to the monochrome mode (S858). Then, the size of the secondarily compressed data in the monochrome mode is calculated from the attribute count values (S859), the address of the secondary compression memory 208 to which the image data size can be consecutively written is calculated in accordance with the data in the working RAM 210 (S860), and the write of the data to the secondary compression memory 208 is started from the write address (S861).

(c) For a normal business color document whose ratio of the color attribute does not satisfy the predetermined condition (NO in S857), even data of the color attribute is subjected to color coding. Thus, the operation mode of the secondary compression section 207 is set to color mode (S862). Then, the size of the secondarily compressed data in the color mode is calculated from the attribute count values (S863), the address of the secondary compression memory 208 to which the image data size can be consecutively written is calculated in accordance with the data in the working RAM 210 (S864), and the write of the data to the secondary compression memory 208 is started from the write address (S865).

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor comprising:
    a background remover which removes background from image data, wherein said background remover corrects a highlight area by converting the highlight area into white data;
    a first compressor which compresses the image data which have been subjected to backround removal by said background remover;
    a divider divides the image data, which have been subjected to background removal by said background remover, to a plurality of blocks;
    an attribute discriminator means for discriminating an attribute of image data in each of the blocks; and
    a second compressor which compresses the image data in a block, which have been compressed by said first compressor, according to the attribute of the block discriminated by said attribute discriminator means.

2. The image processor according to claim 1, wherein said first compressor compresses the image data with a constant-length coding and said second compressor compresses the image data with a variable-length coding.

3. The image processor according to claim 1, wherein an amount of background removal by said background removal means is changeable.

4. The image processor according to claim 1, wherein said background remover includes a lookup table of a relationship between input signal and output signal and removes the background from the image data by using the lookup table.

5. The image processor according to claim 4, wherein the lookup table used by said background remover includes a first area in which the relationship between input and output signals is expressed by a linear equation, and a second area in which the input signal exceeds a predetermined value is changed to the output signal of white.

6. The image processor according to claim 1, wherein the lookup table used by said background remover is written to a memory device in said background remover.

7. A method for processing an image comprising the steps of:
    removing background from image data to correct a highlight area by converting the highlight area to white data;
    compressing the image data which have been subjected to background removal;
    dividing the image data, which have been subjected to background removal, to a plurality of blocks;
    deciding an attribute of image data in each block; and
    compressing the image data in each block, which have been compressed after the background removal, according to the attribute of the block.

8. The method according to claim 7, wherein the image data which have been subjected to the background removal are compressed with a constant-length coding and the image data which have been compressed are compressed with a variable-length coding.

* * * * *